INVENTOR
JOHN D. ATKINSON
BY Ronald J. Kransdorf
ATTORNEY 3,559,207
DATA DISPLAY SYSTEM John D. Atkinson, Rowayton, Conn., assignor to The Bunker-Ramo Corporation, Stamford, Conn., a corporation of Delaware Filed Jan. 16, 1967, Ser. No. 609,537
Int. Cl. H04j *3/16;* H04g *11/04*
U.S. Cl. 340—324 17 Claims

ABSTRACT OF THE DISCLOSURE

A data display system of the type wherein data is displayed in a format having at least one data line, where a separate sweep of a viewing screen is provided for each of the data lines, and including circuitry for permitting the display format to be varied by altering various parameters of the sweep circuitry and the timing controls.

This invention relates to data display systems of the type utilizing electro-responsive display means such as a cathode ray tube. More specifically, the invention relates to display systems of this type wherein data is displayed in a format having at least one data line, where a separate sweep of the tube is provided for each of the data lines.

In copending application, Ser. No. 460,117, now U.S. Pat. No. 3,500,327 filed by R. D. Belcher et al., on June 1, 1965, entitled "Data Handling Apparatus" and assigned to the assignee of the instant application, a raster scanning technique is shown wherein a separate horizontal scan is provided for each row of characters to be presented. A high speed vertical sawtooth is superimposed on each horizontal scan so that each scan covers a predetermined area of the tube face. Characters are formed on the face of the tube by selectively energizing the scanning beam to intensify the tube phosphor during the scan.

The raster pattern described above has an advantage over the normal TV raster pattern in that substantially less data need be transmitted in order to display the same information. It is therefore advantageous to use this pattern in applications where alpha-numeric, graphic, or other data not requiring high resolution are to be displayed. However, the band width advantages which this raster pattern provides has heretofore been achieved at the cost of flexibility. Since the number of scan lines is fixed and the area covered by each scan is fixed, the number of characters which may be displayed, and the character format, are likewise fixed. For example, in the above-mentioned Belcher application, the system shown in the preferred embodiment is limited to a format of four lines of six characters each, or a total of twenty-four characters. One solution to this problem is to provide a separate display device for each format which it is desired to display. This solution is, however, both costly and cumbersome. It is therefore apparent that a display system which provides the band width advantages of the single-scan-per-row raster pattern with some of the flexibility of a TV raster pattern is required. Such a system should be capable of switching from one display format to another in response to either a manual or computer input or in response to some internally detected condition. In order to achieve full flexibility, such a system should also be capable of switching from one display format to another while a single scan of the tube is being performed. This would, for example, permit half the tube to display graphic information, with the other half of the tube displaying several lines of alpha-numeric information describing the graphic display. It would also permit one line of the display to be considerably larger than the other lines of the display, thus permitting a single line to be emphasized.

It is therefore a primary object of this invention to provide an improved data display system.

A more specific object of this invention is to provide a data display system having greater format flexibility while preserving the band width advantages of a single-horizontal-scan-per-row raster pattern.

Another object of the invention is to provide a display system wherein the display format may be selectively varied under either manual, computer, or internal control, to present a greater or lesser number of rows, and/or characters, within the same display area.

Still another object of the invention is to provide the versatility described above without significantly increasing the size, cost, or complexity of the overall display system.

In accordance with the above objects, this invention provides a display system which is capable of presenting data in a plurality of different formats, each of which may have one or more lines. The system includes an electro-responsive display means having a viewing screen which may, for example, be a CRT. A separate sweep of the viewing screen is provided for each line of data to be displayed, with each of the sweeps covering a predetermined area of the viewing screen. The parameters for the circuitry controlling the number of lines of the format, or the spacing between lines, and the area covered by each sweep are made variable, with settings being provided for each format which it is desired to display. A switch or similar device is provided to operate in response to the selection of the desired format to select the proper settings for the various parameters.

The foregoing and other objects, features and advantages of the invention will be apparent from the following more particular description of preferred embodiments of the invention, as illustrated in the accompanying drawings.

Figures 6, 7A:
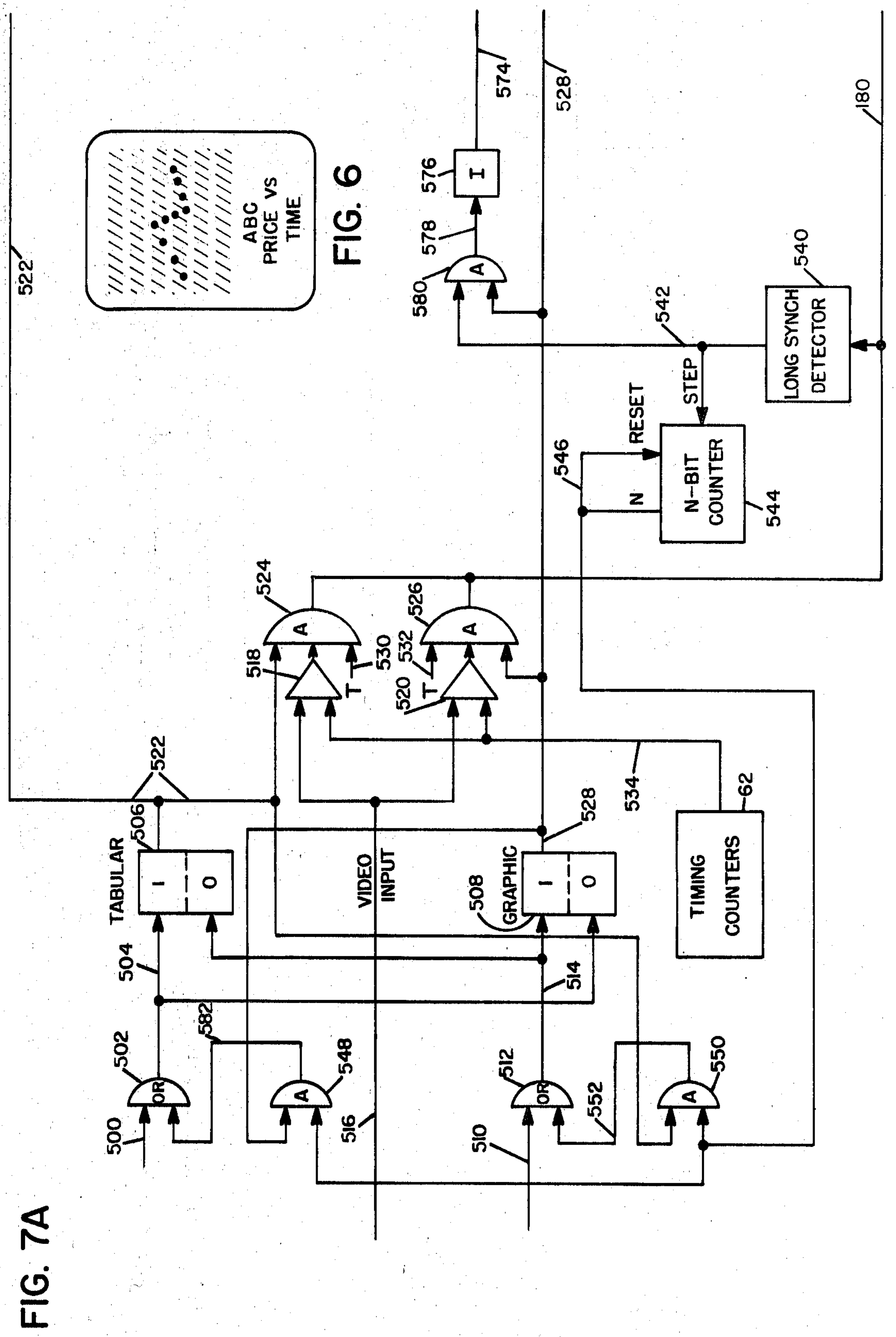
FIG. 6 shows the face of a CRT display presenting two different formats simultaneously.
Figure 7B:
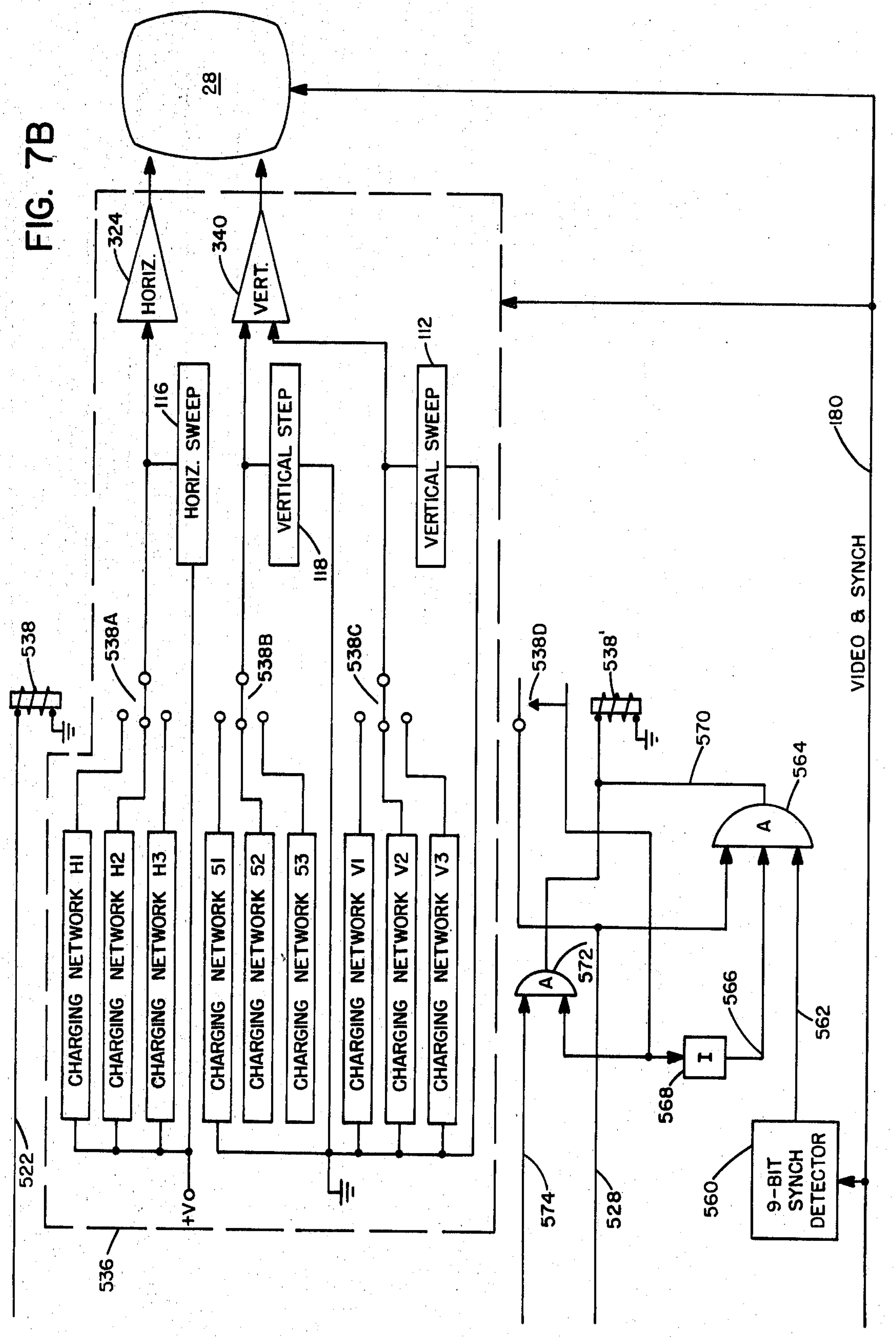

FIGS. 7A and 7B combine to form a circuit diagram of an alternative embodiment of the invention.

The preferred embodiment of the invention, shown in FIGS. 1–5, will be described with reference to a display system of the type shown in the before-mentioned copending Belcher application. This application discloses a stock quotation system comprising a number of remote interrogation/display stations all connected to a common processing unit so as to permit query signals to be sent thereto for processing to develop a reply for the querying station. The central processing unit includes a magnetostrictive delay line arranged as a recirculating cyclical memory for binary bits of data. Each remote station is assigned a corresponding portion of that delay line and the control circuits are so arranged that both the query and reply signals for a particular remote station will be stored in the portion of the delay line assigned to that station.

Entry of a query is effected by operating a manual keyboard at the remote station. This transmits corresponding query signals to the central processing unit, and the storage of the query signals in the delay line at the central unit causes the query characters to be presented on the top line of a CRT display device at the remote station. When the complete answer to the query has been developed and stored in the delay line, corresponding reply characters will appear on the CRT on the next three lines directly beneath the query characters.

However, as indicated previously, the apparatus of the above-identified Belcher application provides a data presentation having a total of only four horizontal lines, each with space for six side-by-side characters. This format, having a total of twenty-four character spaces, is quite satisfactory for the usual Query/Reply messages required to provide information, such as a stock quotation or the like, concerning a single item. However, it has been found desirable under some circumstances to provide selectively, at the same remote unit, other classes of information requiring quite a different format of presentation. For example, stockbrokers' customers can advantageously be provided with composite information concerning multiple items such as information on the current trends of the stock averages, or the identification of those stocks which have reached new highs (or lows) during the day, etc. Such composite information cannot, as a practical matter, be provided in a format having only twenty-four character positions.

The apparatus of the Belcher application has therefore been modified, as for example shown in the embodiment of the present invention depicted by FIGS. 1–5 hereof to provide, on a single small CRT display device at a remote desk unit, either the conventional individual query and reply data, useful for checking on particular stock of interest, etc., or so-called "TRENDS" data comprising information concerning a large number of items and requiring a substantially greater number of characters than the usual Query/Reply display.

Figure 1:
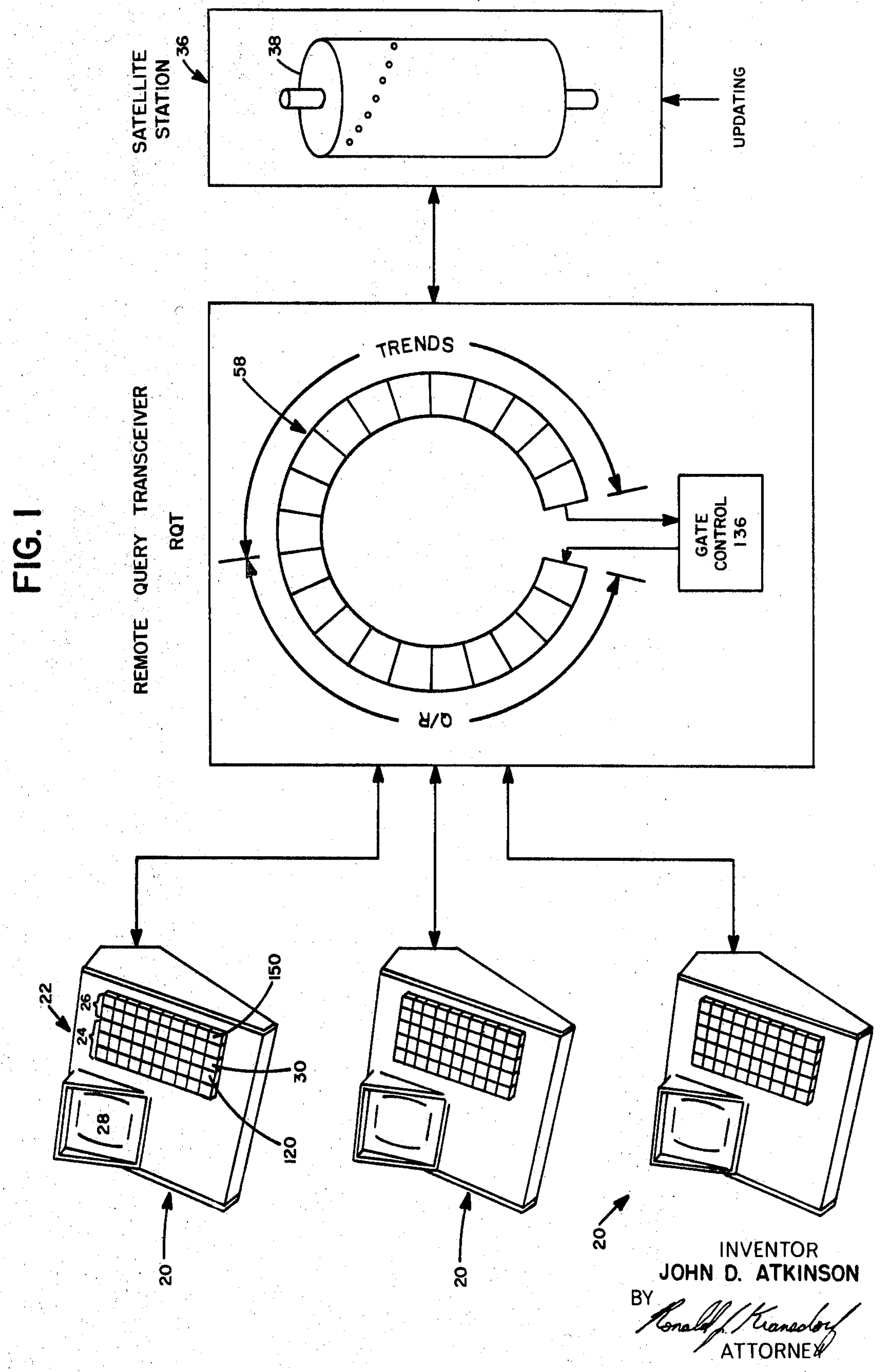
FIG. 1 is a schematic diagram, partly in block form, showing the major elements in a system in accordance with a preferred embodiment of the invention.

Referring now to the left-hand edge of FIG. 1, there is shown a number of stockbrokers' desk units 20, each having a manually-operable keyboard 22 including alphabetic keys 24 and so-called function keys 26 for controlling the entry of query signals for processing and reply. (Note: Elements described herein which also are shown in the above-identified Belcher et al. application are designated with the same reference numeral.) Each desk unit also includes a CRT display means 28 to present both the query messages and the reply messages for viewing by the operator.

In a typical system, there may be ten such desk units, all connected to a common central data processing unit referred to herein as a Remote Query Transceiver (RQT). As explained in more detail in the above-identified Belcher et al. application, the RQT basically comprises a magneto-strictive delay line 58 arranged as a recirculating cyclical memory storage device by means of a coupling connection between the output and input of the delay line. This coupling connection includes gate circuitry symbolically illustrated herein by block 136, and which is adapted to control the insertion or deletion of data bits in the delay line. In one practical installation, the period for a complete cycle was about 6.7 milliseconds, and the data rate was 534,500 bits per second.

Each of the desk units 20 is assigned a section of the delay line 58 for the storage of both query signals developed at the respective keyboard and of reply signals to be sent in response to the query. This apportionment of the delay line is illustrated in FIG. 1 by the delay line segment identified as "Q/R" (Query/Reply) illustratively containing ten sections. It will be understood, however, that the sections assigned individual desk units need not be serially disposed as illustrated, and in fact preferably are interlaced as described in the above-identified Belcher et al. application.

After a complete query has been transmitted to the RQT and stored in one portion of the corresponding section of the delay line 58, control circuits are operative to transmit the query signals from the RQT to a so-called "satellite" station 36. This station includes data storage means in the form of a magnetic drum 38 carrying all of the available information concerning the stocks about which queries may be entered. In a typical system, a number of RQT's would be serviced by a single satellite station, but only one is shown herein. The data stored on the drum 38 are periodically up-dated from a base station (not shown) which continually receives information concerning transactions at the various stock exchanges.

Upon receipt of a query signal from the RQT, the satellite station 36 searches its memory storage for the desired data and transmits that data in the form of a reply message to the RQT. This reply message is stored in a portion of the delay line section assigned to the desk unit originating the query message. Upon being stored in the delay line, the reply message is displayed substantially immediately on the CRT at the corresponding desk unit, to provide the operator with the desired information. The system operates extremely rapidly, and typically requires no more than several seconds to develop a complete reply.

Figure 2:
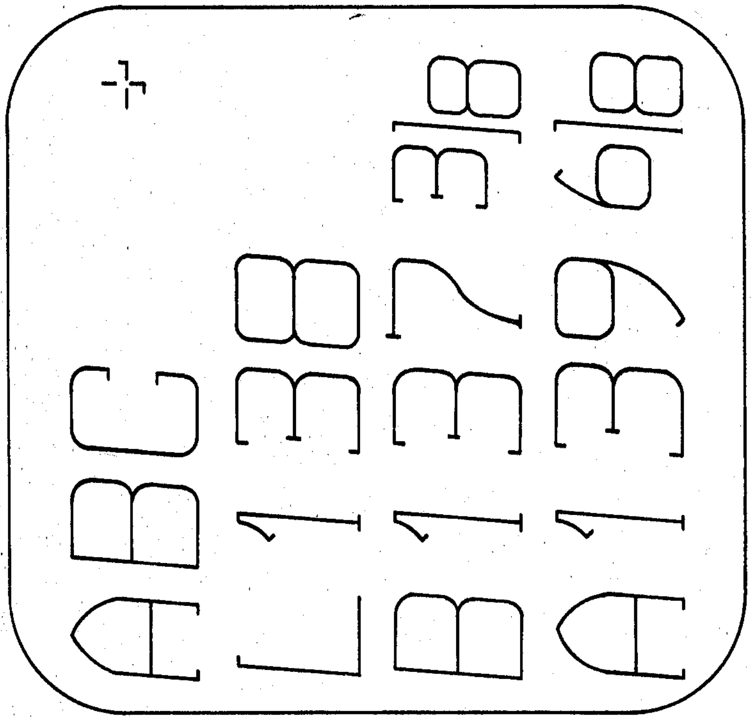
FIG. 2 shows the face of a CRT display presenting a four-line Query/Reply format.

FIG. 2 shows one example of a presentation on the CRT when operating in the Query/Reply mode described. The query message appears in the first horizontal line, and in this example consists of a request for the last sale price, the present bid price, and the present asking price (all three prices being referred to simply as LBA) for a particular stock identified as ABC. The reply occupies the next three horizontal lines of the display, the last price (L) appearing on the second line, the bid price (B) on the third, and the asking price (A) on the fourth. The reply also places a symbol (for example a plus sign) in the upper right-hand corner of the display, to indicate whether the recent price information shows an increasing or decreasing trend for that particular stock. The entire display utilizes a total of only twenty-four character spaces, i.e. for horizontal lines of six characters each.

The CRT display characters are formed in individual 5 x 7 dot matrices. That is, the CRT sweep raster for each character comprises five "up" strokes, spaced horizontally, and the beam is selectively intensified at any of seven positions on each up-stroke to form the desired character. Thus the beam is swept both vertically and horizontally while forming a single line of characters, and is stepped a vertical increment between each line of characters. The sweep and step signals are developed by circuitry which is responsive to synchronizing (synch) pulses accompanying the charter signals developed at the RQT.

The Query/Reply data is transmitted over a video cable together with the appropriate CRT synch pulses for controlling the sweep circuitry for the electron beam. As described in the above-identified Belcher et al. application, the synch pulses are positive-going, while the character data signals are negative-going pulses; permitting the two types of signals to be separated at the remote desk unit and directed to the respective special circuitry responsive thereto.

Reverting now to FIG. 1, the delay line 58 includes a second segment, identified on the drawing as "TRENDS", for providing a broadcast, to any or all of the desk units 20, of data of a class distinctly different from the Query/Reply data previously described, e.g. composite information concerning a relatively large number of items. In one specific embodiment of the invention, the "TRENDS" storage capacity was eleven times as great as that required to operate a single desk unit in the Query/Reply mode described. Again, although the "TRENDS" segment is shown in FIG. 1 as distinct from the Query/Reply segment of the delay line, it is possible (and indeed preferable) to interlace parts of the "TRENDS" storage with the Query/Reply sections previously described. However, it simplifies the presentation of the invention to consider the "TRENDS" section to be distinct, as illustrated in FIG. 1.

Figure 3:
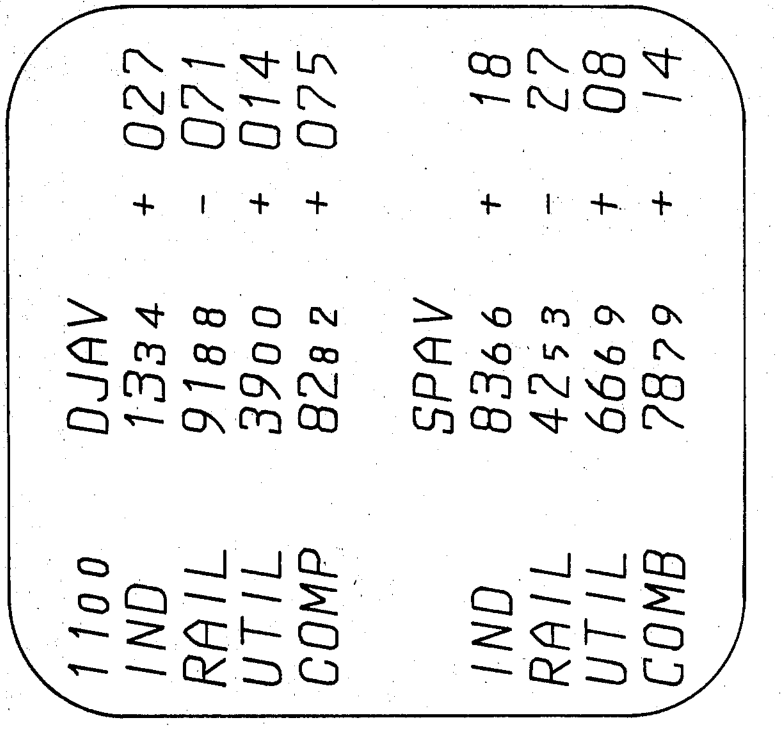
FIG. 3 shows the face of a CRT display presenting an eleven-line "TRENDS" format.

By operating a push-button of the keyboard 22, any desk unit 20 can be caused to display the "TRENDS" data on the corresponding CRT. As shown in FIG. 3, such a presentation contains considerably greater amounts of data than the Query/Reply presentation of FIG. 2. In the embodiment described herein, the "TRENDS" display consists of eleven horizontal lines each having space for eighteen characters. Of course, not all of the eighteen spaces ordinarily will be occupied with characters, because of the need to separate columns of data. Simply as one example, the "TRENDS" presentation illustrated in FIG. 3 is a tabulation of the Dow Jones and Standard & Poor's averages and the net changes in these averages. The top line also includes an indication of the time at which the computation was made, e.g. 11:00 A.M.

Although various arrangements are possible, each of the eleven lines of the "TRENDS" presentation is controlled by a portion of the delay line 58 having a storage capacity sufficient to handle a single desk unit 20 in Query/Reply mode. As previously explained, operation of a single desk unit in Query/Reply mode requires delay line storage for twenty-four characters, whereas a single line of the "TRENDS" presentation requires storage only for eighteen characters. Therefore, not all of the twenty-four character storage space available for each "TRENDS" line need be use, and in an actual embodiment of the invention the first six character positions were left vacant. With that arrangement, the "TRENDS" characters (up to eighteen characters per line) were stored in the subsequent eighteen positions of the delay line section, i.e. those positions which, if the storage section were used for Query/Reply mode, would carry the second, third and fourth lines containing the reply message. Although this arrangement does not utilize fully the entire delay line storage capacity, it provides certain advantages with regard to control circuit simplicity where both Query/Reply and "TRENDS" data are stored together in the same delay line.

Because the "TRENDS" format of FIG. 3 contains many more lines per frame, as well as many more characters per line, than the Query/Reply format of FIG. 2, it is not possible to display the "TRENDS" data simply by transmitting corresponding video signals to the CRT at a desk unit 20. That is, for display on a CRT, the "TRENDS" format is not compatible with the regular Query/Reply format. To provide a practical system wherein both formats can be displayed selectively on the same CRT poses a problem which has been solved in accordance with an important aspect of the present invention.

In general, the approach used is to provide each desk unit 20 with data transmission control means enabling the operator to select either the Query/Reply mode of operation or the "TRENDS" mode of operation. In Query/Reply mode, the desk unit functions with the RQT in the manner described in the above-identified Belcher et al application, and no "TRENDS" data is transmitted. In the "TRENDS" mode, however, any Query/Reply data in the delay line is suppressed and the "TRENDS" data stored in the delay line 58 is sent to the desk unit over the same video cable which previously carried the Querry/Reply data.

This "TRENDS" data is accompanied by CRT synch signals suited for the "TRENDS" format and having a timing pattern different from that of the synch pulses accompanying the Query/Reply signal data. The desk unit 20 includes sweep control means which, when the unit is switched to "TRENDS" mode, alters the condition of the CRT sweep circuitry in such a way as to accommodate the different "TRENDS" format. This alteration provides a smaller vertical sweep to reduce the character height, a slower horizontal sweep to reduce the character width, and a smaller incremental step between lines to permit the display of more lines per frame. The end result is that the "TRENDS" data is presented in the same area of the CRT as the Query/Reply data, but with smaller and closer characters to permit the increased amount of data to be displayed.

Figure 4:
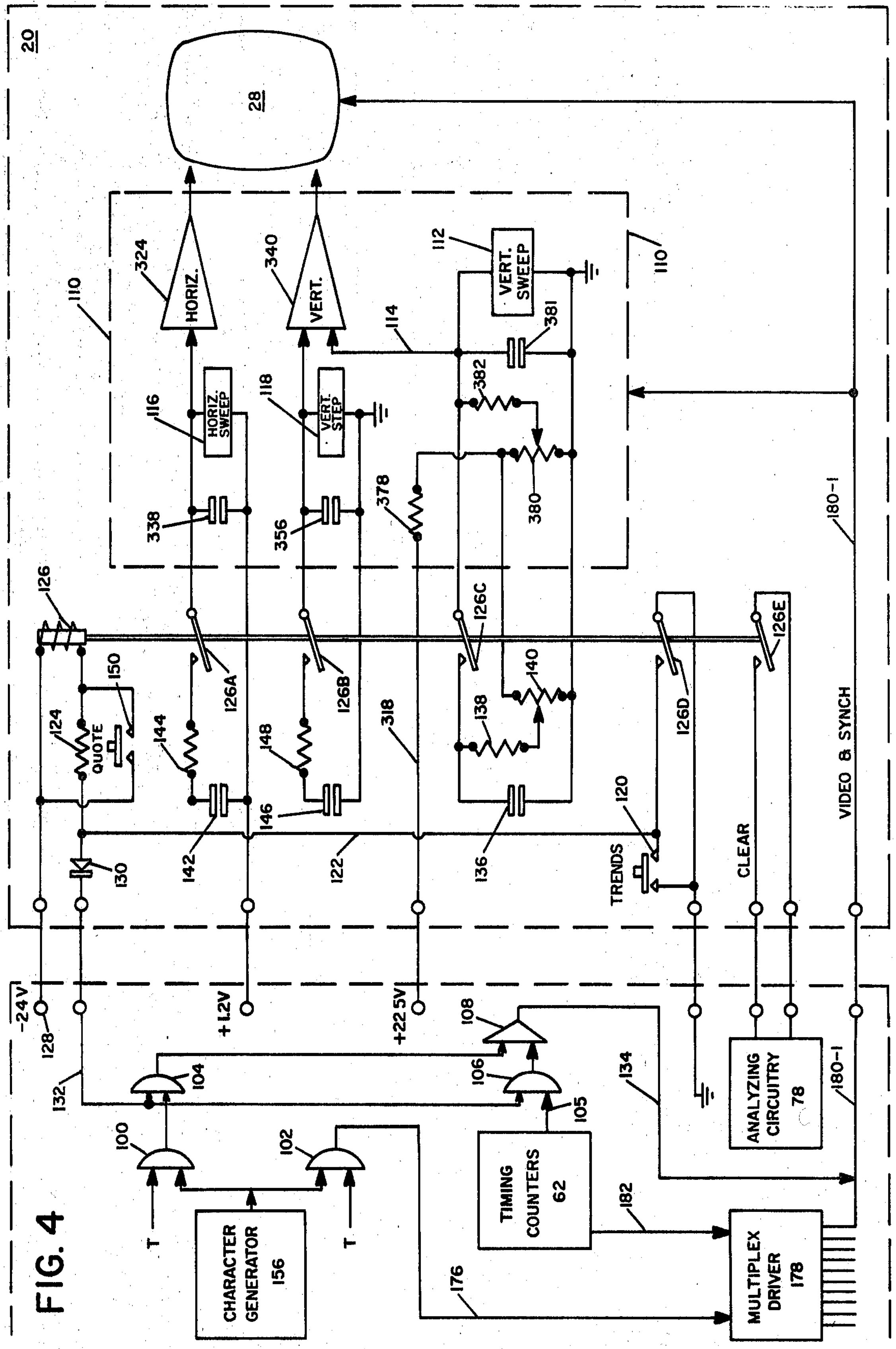
FIG. 4 is a circuit diagram (with certain conventional elements omitted) showing the switch provisions for altering the CRT sweep circuits to accommodate the two different data formats shown in FIGS. 2 and 3.

In more detail, and referring now to the upper left-hand corner of FIG. 4, the RQT includes a character generator 156 which converts the permutation code data stored in the delay line 58 to 5 x 7 dot matrix data suitable for controlling the CRT character display, for example, as described in copending application, Ser. No. 460,307, filed June 1, 1965, by E. M. Dean. Since the delay line data is continuously being recycled and applied to the input of the character generator, the output of the character generator presents a corresponding cycling of character data representing all of the Query/Reply and "TRENDS" data stored in the delay line. Typically, during any one cycle, all of the Query/Reply data for the ten remote desk units will appear as a sequential group, and thereafter the entire set of "TRENDS" data will appear.

The output of the character generator 156 is directed to two AND gates 100 and 102 which are opened at different times by suitable timing signals T derived from the Timing Counters 62. The upper gate 100 selects the "TRENDS" data and directs it to a second AND gate 104 which is activitated by selection controls at the desk unit 20 as will be explained. The selection circuitry also includes an AND gate 106 which is opened at the same time as AND gate 104 to pass "TRENDS" synch signals form the Timing Counters 62. The resulting composite video and synch signals from gates 104 and 106 are directed to a Coax Driver Amplifier 108 which feeds the "TRENDS" signals to the remote desk unit 20 through video cable 180–1. This Driver Amplifier 108 produces a positive output for synch signals and a negative output for video signals. Although only one set of gates 104, 106 and Driver 108 is shown herein, it will be understood that in the complete system there will be one set for each remote desk unit 20, with each set being selectively controlled from its desk unit in a manner to be described.

The Query/Reply data from the character generator 156 is selected by AND gate 102 and put on a line 176 leading to the Multiplex Driver 178. This Driver also receives synch signals from the Timing Counters 62 via line 182, and operates to distribute the composite Query/Reply and synch signals to the respective video cables 180-1, etc. leading to the corresponding desk unit 20, as described in the aforementioned copending application.

The video and synch signals on video cable 180–1 are directed both to the CRT 28, where the video signals energize the Z-axis beam intensification circuitry, and also to the CRT sweep circuitry within the broken-line enclosure generally indicated at 110, where the synch signals control the sweep of the beam both vertically and horizontally across the face of the CRT. The CRT and its associated sweep circuitry 110 have been shown schematically and with certain parts and interconnections omitted in order to simplify the disclosure so as to clarify the present invention; for information concerning the omitted details, reference may be made to the above-identified copending application of Belcher et al.

Figure 5:
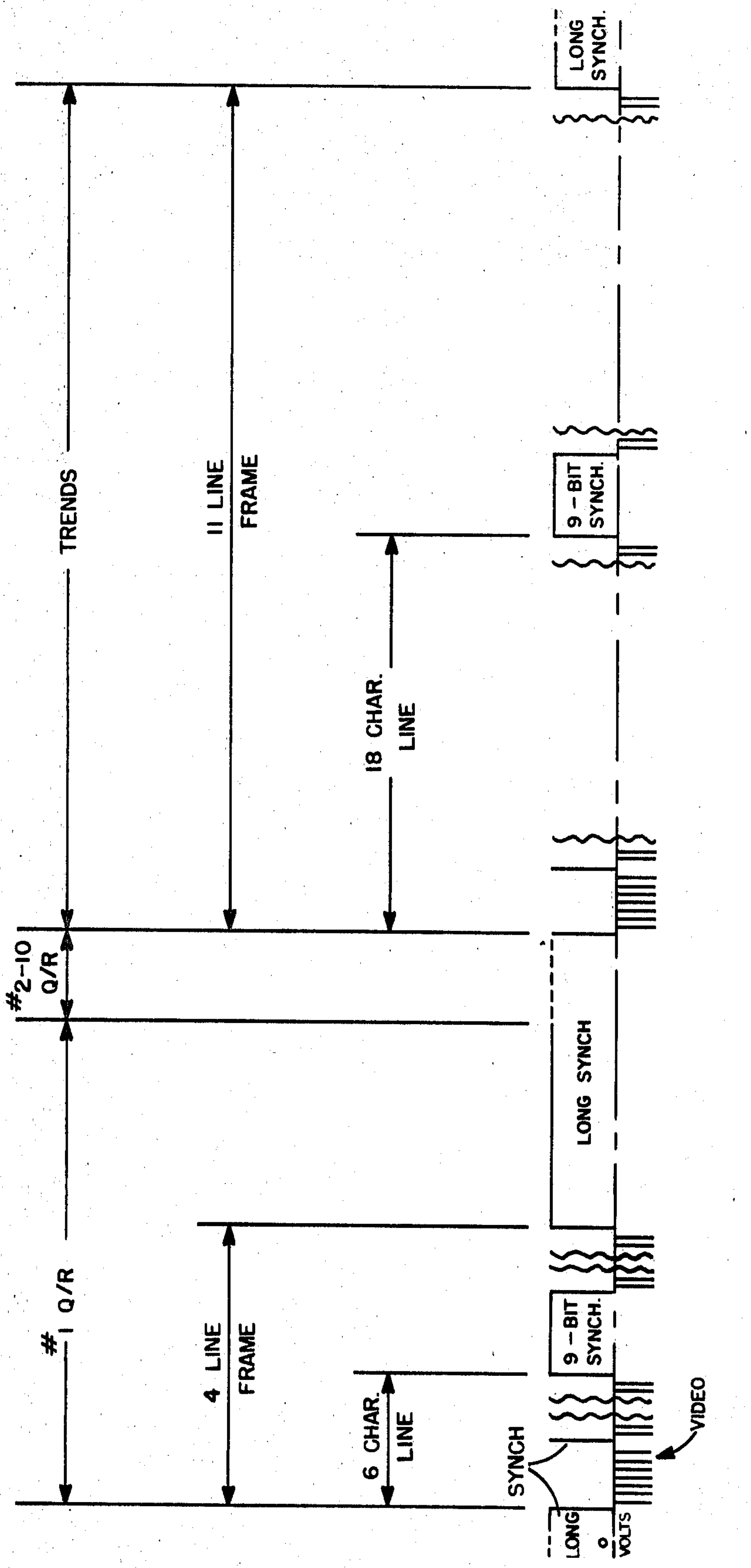
FIG. 5 is a timing diagram showing the video and synch signals transmitted for the embodiment of the invention shown in FIG. 4.

As shown in FIG. 5, the composite signals on video cable 180–1 consist of positive-going synch pulses and negative-going video pulses. Before the start of a display sequence in either the Query/Reply or "TRENDS" format, there is a long positive synch pulse (i.e. a pulse substantially greater than nine video bits in length). This signal is detected in the sweep circuitry 110 by integrating means described in the Belcher et al. application, and the sweep circuitry thereupon is set to its start condition with the CRT beam positioned in the upper left-hand corner of the face of the CRT.

At the end of the long synch signal, the voltage on the video cable drops to zero and this activates the sweep circuitry so as to start the character display raster. Specifically, the vertical sweep voltage is produced by a vertical sweep circuit 112 which develops a linearly-changing voltage. This voltage is applied to an RC amplitude proportioning network consisting of a capacitor 381 and a resistor 382, and the resultant output voltage is connected via line 114 to one input of a differential amplifier 340 which drives the vertical deflection plates of the CRT 28. This RC network 381, 382 controls the attenuation of the sweep voltage during the vertical sweep period, and thus determines the vertical height of each character. Resistor 382 also is connected to a potentiometer 380 which is energized through a resistor 378 by a high-voltage line 318 to provide an adjustment of vertical centering for the CRT electron beam.

The horizontal sweep voltage is produced by a horizontal sweep circuit 116 which starts at the end of the long synch signal to develop a linearly-changing voltage (at a lower rate than the vertical sweep voltage) for moving the electron beam laterally across the face of the CRT. This horizontal sweep circuit includes a charging capacitor 338 which determines the rate of voltage change, thus determining the speed of horizontal beam movement and thereby the width of each character.

While the beam is sweeping upwards under the control of the vertical sweep circuit 112, the negative-going video pulses intensify the beam at predetermined spots (a maximum of seven), in accordance with the coded pulse output of the character generator 156, so as to form one slice of the character to be presented. At the top of the up-stroke, a positive-going synch pulse occurs and is detected by the sweep circuitry 110 which thereupon resets the vertical sweep circuit 112 to start another up-stroke at a position displaced horizontally a small amount from the preceding up-stroke. This sequence of operation continues as the beam moves laterally across the face of the tube until a total of six characters (or character positions) have been developed.

At that point, which is the right-hand end of the horizontal line of characters in Query/Reply mode, an intermediate-length synch pulse of nine bits duration is produced. This intermediate synch pulse is detected by integrating means (not shown herein) which actuates a step-generating circuit generally indicated at 118. The output of this step circuit is applied to the other input of the vertical amplifier 340, and this amplifier applies to the vertical deflection plates of the CRT a voltage increment causing the beam to shift downwardly a distance providing the desired separation between the lines of characters. At the same time, the vertical and horizontal sweep circuits 112 and 116 are reset so as to shift the beam back to the left-hand edge of the CRT display. Both sweep circuits then are reactivated and a duplicate cycle of operation is carried out to provide a sweep raster for the second line of characters of the display.

The same sequence is followed for the third and fourth lines of the display on the CRT 28. At the end of the fourth line, a "long" synch signal is produced which causes the electron beam to be reset to its start position at the upper left-hand corner of the face of the CRT, awaiting the next cycle of character display.

When the operator at the remote desk unit 20 desires to observe the "TRENDS" display, he presses a switch control push-button 120 (the "TRENDS" button) on the front of the desk unit 20. Pressing this button closes a switch to complete a relay energizing circuit from a ground connection through line 122, a resistor 124, and the coil of a relay 126 to a negative power supply terminal 128. One of the relay contacts 126D serves to lock-up the relay. Completion of the energizing circuit for the relay also causes a control signal to be directed through a diode 130 and line 132 to the AND gates 104 and 106 previously described. This control signal opens these gates which thereupon transmit the composite "TRENDS" and synch signals through Driver output line 134 to the video cable 180–1 leading to the CRT display unit.

Another relay contact 126E closes to activate the "Clear" circuitry at the RQT. Contact 126E parallels the switch contacts of the "Clear" button 30 (FIG. 1) described in the above-identified Belcher et al. application, and thus operates the "Clear" circuitry in the same way. That is, closure of contact 126E is detected by analyzing circuitry 78 at the RQT, and this circuitry energizes suitable timed logic circuits which erase all of the Query/Reply character data stored in that section of the delay line 58 which corresponds to the particular desk unit involved. Even though the CRT synch signals for the Query/Reply data storage section continue to be transmitted through video cable 180–1, the erasure of the character data from the delay line prevents any interference with the "TRENDS" display from being developed. Also, since the time in the cycle at which synch pulses appear on Query/Reply synch line 182 corresponds to the time that Query/Reply data is being read from delay line 58 (FIG. 1) and is different from the time that "TRENDS" data is being read from the delay line, these synch pulses do not cause spurious sweep resets during the writing of the data. Accordingly, this clear contact 126E operates in conjunction with AND gates 104 and 106 as a selection means to select the "TRENDS" data in place of the Query/Reply data.

Closure of relay contact 126C couples to the vertical sweep circuit 112 an RC network consisting of a capacitor 136 and a resistor 138, corresponding to capacitor 381 and resistor 382 of the basic sweep circuit. Resistor 138 also is connected to a potentiometer 140 paralleling the vertical centering potentiometer 380. The RC network 136, 138 serves to further attenuate the vertical sweep voltage and thus to reduce the proportion of the vertical sweep voltage which is applied to the vertical amplifier 340. This effectively reduces the vertical size of each character as indicated in FIG. 3. Potentiometer 140 is set to shift upwards a small amount the starting point for the electron beam in the upper left-hand corner of the CRT, so that the upper edge of the smaller-size characters of FIG. 3 will be in the same position as the upper edge of the basic characters of FIG. 2.

Closure of relay contact 126A connects an additional capacitor 142 and a small padding resistor 144 (15 ohms) in parallel with the charging capacitor 338. This effectively increases (to approximately triple) the charging capacitance for the horizontal sweep circuit 116, and slows down the lateral speed of the electron beam an appropriate amount to permit display of all eighteen characters of each line of the "TRENDS" format.

Closure of the remaining contact 126B connects a capacitor 146 and a small padding resistor 148 (150 ohms) in parallel with the capacitor 356 of the vertical sweep circuit 118. This additional capacitance causes a reduction in the amount of incremental voltage change produced by the current pulse from the vertical step circuit, and thus reduces the vertical distance between corresponding points of adjacent lines of characters of the display. The reduction in vertical spacing is adjusted to provide the desired presentation of eleven lines in place of the original four lines of the Query/Reply display.

As shown in FIG. 5, the synch signals produced during the "TRENDS" segment of the delay line cycle are of the same general type as produced during the Query/Reply segments. That is, the start of a display comes at the end of a long synch signal, a short (one bit) synch signal occurs at the end of each seven-bit times to reset the vertical sweep circuit and start a new up-stroke, and a nine-bit synch signal occurs at the end of a line. However, the "TRENDS" synch pulses, which appear on line 105 when "TRENDS" data is being read from delay line 58 (FIG. 1), have a timing pattern different from the synch pulses associated with the Query/Reply data. Specifically, since there are eighteen characters in each line of the "TRENDS" format, the nine-bit intermediate synch pulse does not occur until eighteen complete character rasters have been generated. Also, since the "TRENDS" format includes eleven lines rather than four, the endof-frame long synch does not occur until after eleven lines, rather than after four lines as in the Query/Reply mode. Because the same type of synch signals are used, it is not necessary to make any changes to the integrating circuitry which detects and discriminates between the different lengths of sync pulses for the purpose of selectively resetting the different parts of the sweep circuit 110.

The data stored in the "TRENDS" segment of the delay line 58 may be changed periodically to present different classes of itemized information. Typically, the stored data may be changed every ten to thirty seconds to carry out a sequence of different data presentations, for example, six different presentations. Such data presentations may comprise, in addition to the stock averages of FIG. 3, a listing of those stocks having the greatest price advance, a listing of those stocks reaching new lows (or highs) for the year, the number of stocks which have advanced, declined or are unchanged, etc. Thus, once having transferred to "TRENDS" mode of operation, the operater will see displayed on the CRT screen 28 a series of data presentations which repeats after a predetermined time period.

The changing of the data stored in the "TRENDS" segment of the delay line 58 is controlled by the satellite station 36 which carries on drum 38 all of the data for the separate "TRENDS" presentations to be shown sequentially on the CRT. The satellite station is updated periodically by the base station (not shown), so that the data transferred to the "TRENDS" segment will be relatively current. Advantageously, the time of the computation of the data will be presented along with the itemized information.

When the operator has finished with the "TRENDS" presentation, he can switch back to Query/Reply mode by pressing a switch control push-button 150 (the "Quote" button) on the front of the desk unit 20. This push-button closes a switch which shorts out the coil of the relay 126 so that the relay drops out and all of its contacts open. When that occurs, the sweep circuitry 110 is returned to normal condition for operation with the Query/Reply format of six characters per line and four lines per frame, and the gates 104 and 106 close to suppress the "TRENDS" data signals. Thus, the operator can interrogate the RQT for any given selected item merely by operating the other push-buttons 24 and 26 as described in the above-identified Belcher et al. application.

ALTERNATIVE EMBODIMENT

The preferred embodiment of the invention described so far provides a degree of flexibility over the copending Belcher application. FIG. 7 shows an alternative embodiment of the invention which illustrates various means of achieving even greater flexibility. For this embodiment of the invention, it is assumed that both tabular data and graphic data are to be displayed on a single monitor tube 28. The tabular data would be in a format similar to that shown in FIG. 3, with a stock name or stock type identification in the left-hand column, a time indication in the middle column, and a price designation in the right-hand column. After showing the table for a predetermined period of time, the system switches to a graphic display of the type shown in FIG. 6. For this display, half the tube 28 is covered, during a single sweep, with a graph representing the data presented in the previously-shown table. The remainder of the tube, which may, for example, be covered in three horizontal scans, is used to identify, with alpha-numeric characters, the data being graphically displayed. It is therefore seen that when a display of the type shown in FIG. 6, is being presented, after the first line is traced on the tube face, there is a shift in format from one requiring two sweeps to cover the face of the tube to one requiring six sweeps to cover the face of the tube. The graphic display likewise remains on the tube for a predetermined period of time after which the system returns to the tabular display. The switch in display type and format is accomplished automatically in response to conditions detected inside the display system.

Referring now to FIG. 7, assume that a signal is initially applied, either under manual or computer control, through line 500, OR gate 502 and line 504 to set Tabular flip-flop 506 to its ONE state. The signal on line 504 is also applied to reset Graphic flip-flop 508 to its ZERO state. When flip-flop 506 is in its ONE state, the system is set to display tabular data of the general type shown in FIG. 3. If it had initially been desired to operate the system with a graphic display of the type shown in FIG. 6, a signal would have been applied through line 510, OR gate 512, and line 514 to set Graphic flip-flop 508 to its ONE state.

It is assumed that video input is applied to the system through line 516 from a source (not shown) which may, for example, be a delay line of the type shown in FIG. 1. The input consists of data required for the tabular display which occurs at a predetermined time in the cycle followed by the data for the graphic display which occurs at a different predetermined time in the cycle. The signals on line 516 are applied as one input to amplifiers 518 and 520.

Output line 534 from timing counters 62 is a second input to each of the amplifiers 518 and 520. Timing counters 62 are internally programmed to generate three distinct sets of timing pulses. During the time that tabular data appear on video input line 516, timing counters 62 are generating synch pulses required for a tabular format of the type shown in FIG. 3 on output line 534. During the time period that graphic data appear on video input line 516, timing counters 62 first generate the synch pulses required for the graphic portion of the display and then generate the synch pulses required for the alpha-numeric portion of the graphic display. These pulses also appears on output line 534. With timing counters 62 operating in a cyclic manner as indicated above, any of a variety of settable pulse generators may be employed to perform the required function.

The video and synch outputs from amplifiers 518 and 520 are applied as one input to AND gates 524 and 526 respectively. The remaining inputs to AND gate 524 are output line 522 from the ONE side of Tabular flip-flop 506 and timing line 530, from a source not shown, which has a signal applied to it only during time intervals when tabular data are being applied to line 516. AND gate 524 is therefore fully conditioned to pass the output from amplifier 518 only when the system is in its tabular mode of operation and tabular data appear on video input line 516. Similarly, the second input to AND gate 526 is output line 528 from the ONE side of Graphic flip-flop 508 and the final input to this AND gate is timing line 532, which has a signal applied to it, from a source not shown, only during such time periods as graphic data appear on video line 516. AND gate 526 is therefore fully conditioned only when the system is in graphic mode and graphic data appear on video line 518. The source for timing lines 530 and 532 may, for example, be an extra field (or fields) in the delay line 58 of FIG. 1, or may be additional outputs from the timing counters.

The video and synch outputs from AND gates 524 and 526 are applied to a common video-synch line 180, the function of which has been previously described. The video pulses on line 180 are applied directly to monitor tube 28 to control the intensity of the sweeping beam while the synch pulses on line 180 are applied to sweep control circuit 536 to control the sweep in a manner which is described in detail in the copending Belcher application. Assuming, as has been done, that the system is operating in the data mode, a signal appears on ONE-side output line 522 from Tabular flip-flop 506 which signal is applied through relay coil 538 to ground. When coil 538 is energized in this manner, each of the contacts 538A–538C is transferred from its normal position to its upper position. This causes charging networks H1, S1, and V1 to be connected in series with horizontal sweep circuit 116, vertical step circuit 118, and vertical sweep circuit 112 respectively. Each group of charging networks H1–H3, S1–S3 and V1–V3, may in fact share a number of common elements. However, for convenience, they are shown as being completely separate, even though they may differ only in the value of one parameter. The variations in the charging networks may be effected, for example, by changing the value of the capacitor to be charged or by changing the value of the attenuation placed between the charging circuit and the corresponding sweep circuit. These are the two methods shown in FIG. 4. Other ways in which the charging circuit could be varied would include changing the value of the charging resistance or otherwise changing the value of the charging current.

With coil 538 energized and contacts 538A–538C in their upper position, the proper charging circuits are selected to set up a tabular format of the general type shown in FIG. 3. With AND gate 524 conditioned, the proper video pulses are applied to line 180 for this form of display with the appropriate synch pulses interspersed from timing counter 62. The video and synch pulses which are generated during the time that graphic information is being applied to input line 516 are blocked from being applied to line 180 by AND gate 526.

The system operates in a manner substantially the same as that described with reference to the embodiment of the invention shown in FIG. 4, until a complete table has been traced on viewing screen 28. At this time, a long synch pulse appears on line 180 causing the sweep and step circuits to be reset to their initial position. The long synch pulse is also detected by detector 540 causing an output signal on line 542 which is applied to increment *n*-bit counter 544 one position. Assuming that *n* is greater than ONE, nothing further happens at this time and the system proceeds to retrace the tabular data on the viewing screen 28 the next time that these data are applied to video input line 516. At the end of each trace of the tabular data on the viewing screen detector 540 generates another output signal to increment *n*-bit counter 544. At the end of the *n*th cycle, the counter is stepped to a value of *n* causing an output signal on ine 546 which is applied to reset the counter and is also applied as one input to AND gates 548 and 550. Since Tabular flip-flop 506 is in its ONE state at this time, generating an output signal on line 522, AND gate 550 is fully conditioned to generate an output signal on line 552 which is applied through OR gate 512 and line 514 to set Graphic flip-flop 508 to its ONE state and to reset Tabular flip-flop 506 to its ZERO state. Thus, after *n* cycles of displaying the tabular data, the system switches to a graphic mode of operation.

The resetting of Tabular flip-flop 506 to its ZERO state terminates the signal on ONE-side output line 522, thus cutting off the flow of current through coil 538. Contacts 538A–538C therefore return to their center position, thus connecting charging networks H2, S2, and V2 across horizontal sweep circuit 116, vertical step circuit 118, and vertical sweep circuit 112, respectively. With Graphic flip-flop 508 in its ONE state, a signal appears on ONE-side output line 528 to condition AND gate 526. The video and synch pulses for the Graphic display from amplifier 520 are therefore permitted to pass to line 180.

From FIG. 6 it is seen that the first sweep of the Graphic dispay starts near the middle of the left edge of the screen and sweeps over the upper half of the tube. In order to obtain fairly high resolution for the Graphic display the horizontal sweep may be made fairly slow, thereby providing a large number of vertical sweeps for the row. Also, while only seven intensification positions are provided for each vertical sweep of an alpha-numeric character, a larger number of intensification positions per vertical sweep may be desirable for a Grapic display.

When the end of the first row of the Graphic dispay is reached, the end of the graph-tracing portion of this display, a nine-bit synch pulse appears on line 180. This pulse is detected by nine-bit synch detector 560 causing an output signal to appear on output line 562. The signal on line 562 is applied as one input to AND gate 564, the other inputs to this AND gate being ONE-side output line 528 from Graphic flip-flop 508 and output line 566 from inverter 568. Inverter 568 generates an output signal when contact 538D is open. Therefore, AND gate 564 is fully conditioned at this time to generate an output signal on line 570, which is applied through coil 538' to ground. The signal through coil 538' is effective to move contacts 538A–538D to their lower position. The closing of contact 538D permits the signal on ONE-side output line 528 from Graphic flip-flop 508 to be applied to one input of AND gate 572. The input to inverter 576 is output line 578 from AND gate 580. AND gate 580 is fully conditioned only when a long synch is detected by detector 540 and the system is in Graphic mode. Therefore, when coil 538' is initially energized by the output signal from AND gate 564 causing contact 538D to be closed, AND gate 572 is fully conditioned to generate an output signal on line 570 which is applied to hold coil 538' energized.

The transferring of contacts 538A–538C to their lower positions connects charging networks H3, S3, and V3 across horizontal sweep circuit 116, vertical step circuit 118, and vertical sweep circuit 112, respectively. The proper charging parameters for a six-line-per-frame raster are in this manner established. Timing counters 34 are at this time generating the proper synch pulses for this type of scan. When the three alpha-numeric lines of the Graphic display have been completed, a long synch pulse is again applied to line 180. This synch pulse is detected by long synch detector 540 causing an output signal on line 542 which is applied to step *n*-bit counter 544 and is also applied to fully condition AND gate 580 to generate an output signal on line 578. The signal on line 578 inhibits the output from inverter 576, deconditioning AND gate 572, and thereby causing a momentary loss of current in coil 538'. This permits contacts 538A–538D to return to their normal positions. The proper charging parameters for the first, Graphic line, of the Graphic display are in this manner reestablished. The next time that Graphic information appears on video input line 516, the circuit is ready to repeat the above-described sequence of operations resulting in a display of the type shown in FIG. 6 on the face of the display tube.

The above-described sequence of operations is repeated, with *n*-bit counter 544 being incremented at the end of each iteration, until, after *n* cycles have been completed, *n*-bit counter 544 is incremented to a count of *n*. At this time, a signal again appears on line 546, resetting counter 544, and fully conditioning AND gate 548 to generate an output signal on line 582 which is applied through OR gate 502 and line 504 to again set tabular flip-flop 506 to its ONE state and to reset Graphic flip-flop 508 to its ZERO state. The system is thus restored to the tabular mode of operation and a new cycle of operation is initiated.

From the above it is apparent that a system of great versatility has been provided. If the use to which the system is to be put is known in advance, a predetermined number of parameter settings may be provided, as shown in FIGS. 4 and 7, to accommodate the required formats. Timing counters 62 can also be designed or programmed to generate the desired timing pulses in the proper sequence. However, it may be desired to design a system capable of accommodating any format having a number of lines from, for example, one to ten, or one to twenty. In this case, variable resistors or variable capacitors could be used in the various charging networks and the proper settings for these elements could be selected under either manual or computer control. With this more general mode of operation, an input would be provided from the selection mechanism to the timing counters to assure that proper synch pulses are generated. Even the variation in format within a single scan of the tube, such as for example is shown in FIG. 6, could be achieved under computer control.

While, in the embodiments of the invention described so far, relay switches have been employed, it is to be understood that electronic or other switching devices could be employed. Similarly, while the invention has heretofore been described solely with reference to a single-horizontal-sweep-per row scan pattern, it is equally applicable with certain related scan patterns as, for example, a single horizontal sweep per two rows or a single vertical sweep per column.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A data display system comprising, in combination, a central station including data storage means having first and second separate sections thereof for storing character data of first and second classes respectively; at least one remote station operable with said central station and having first and second modes of operation to display selectively the data stored in said first or second sections; transmission means coupling said remote and central stations to carry selection signals from said remote station to said central station and display control signals from said central station to said remote station; said remote station including electro-responsive data display means of the type wherein an electron beam is controlled by a direction of movement control means to perform a single sweep of a viewing screen for each row of data to be displayed, there being a plurality of writing strokes for each of said sweeps; signal generating means at said central station and responsive to the data stored in said first and second sections of said data storage means to produce first and second sets of composite display control signals including respective sets of direction control signals for said direction of movement control means intermixed with corresponding sets of character data signals derived from said first and second storage section, said character data signals being adapted to intensify the beam of said data display means at selected positions of said beam so as to produce individual characters corresponding to the data stored in said first or second sections; the timing patterns of said first and second sets of direction control signals corresponding to first and second different formats of presentation on said data display means requiring first and second characteristics of said direction control means; switch means at said remote station for transferring between said first and said second modes of operation, said switch means including selection means arranged to activate said data display means for presenting characters from either said first or said second sections of said data storage means, and condition-altering means forming part of said direction control means and operable by said switch means into first or second conditions to produce in said direction control means said first or second circuit characteristics respectively, thereby to select for display the characters from either said first or said second data storage sections and to provide such display with said first or second formats of data presentation respectively.

2. Apparatus as claimed in claim 1, wherein said data display means comprises a CRT device, said direction control means comprising sweep circuitry for generating a sweep raster by means of vertical and horizontal sweep voltages; said direction control signals consisting of synch signals for actuating said sweep circuitry.

3. Apparatus as claimed in claim 2, wherein said second storage section contains a substantially greater amount of character data than said first storage section; said sweep circuitry in said second condition providing sweep voltages which change more slowly than in said first condition; thereby to reduce the size of the character presentation on said CRT to accommodate the increased number of characters to be displayed when operating with said second data storage section.

4. Apparatus as claimed in claim 3, wherein said sweep circuitry provides in said first condition a first sweep raster accommodating a presentation having a plurality of horizontal lines per frame, with each line containing a plurality of characters; said sweep circuitry in said second condition providing a second sweep raster covering the same display frame area as said first sweep raster but providing substantially more lines per frame, with each line containing substantially more characters.

5. A data display system comprising a central station having a cyclically-operable recirculating data storage means containing first and second sections for storing character data of different classes; at least one remote station operable with said central station, said remote station having a CRT display and manually-operable controls for effecting entry of messages in coded form; sweep circuitry forming part of said CRT display for controlling the beam thereof to provide a vertical and horizontal raster suitable for forming characters by selective intensification of the beam in a dot-matrix configuration; character generator means responsive to the output of said data storage means for producing first and second sets of video signals suitable for intensifying said CRT beam to form characters on the display face of said CRT and corresponding respectively to character data stored in said first and second data storage sections; synch pulse generating means for developing first and second sets of synch pulses for controlling said sweep circuitry for said first and second sets of video signals, said two sets of synch pulses having different timing patterns to correspond to different data presentation formats for said two sets of video signals; a video channel connecting said central station to said remote station; coupling means for directing said first and second sets of video signals and synch pulses to said video channel with said video signals having a polarity opposite to that of said synch pulses to permit selective response thereto at said remote station; selection means operable into either first or second condition for selecting either said first or said second set of video and synch pulses for application to said CRT and the sweep circuitry thereof; means for coupling the selected set of video and synch pulses from said video channel to said CRT and said sweep circuitry to effect a presentation of the character data thereof on the face of said CRT; sweep control means forming part of said sweep circuitry and operable into first or second conditions to produce sweep signals having first or second characteristics suited for presenting said first or second sets of video signals on said CRT; and switch means at said remote station for placing said selection means and said sweep control means in either of said first or second conditions so as to present on said CRT either the data from said first storage section or the data from said second storage section, in corresponding format.

6. Apparatus as claimed in claim 5, wherein said sweep control means includes means for altering the rate of vertical and horizontal beam movement so as to change the size of the character presented.

7. Apparatus as claimed in claim 6, wherein said sweep circuitry includes means for producing an incremental step of voltage to be applied to the vertical deflection means of the CRT and thereby to establish a spacing between horizontal lines of characters; said sweep control means also including means to change the magnitude of said voltage step to permit a different number of lines to be generated within the same display area.

8. Apparatus as claimed in claim 7, wherein said sweep control means includes means to alter the start position of the top line of characters, thereby to maintain the same limit for the top edge of the display characters in the top line.

9. A query and reply system comprising a central station having cyclically-operable recirculating data storage means having first and second sections each adapted to carry character data; at least one remote station coupled to said central station for operation therewith; an electro-responsive data display device having a viewing screen at said remote station; manually-operable means at said remote station for developing query signals to be sent to said central station for storage in said first section of said data storage means; processing means responsive to a query message stored in said first data storage section and operable to produce a reply message for storage in said first data storage section along with the corresponding query message; said second data storage section containing character data of a class different from the query and reply messages of said first section; first data transmission means for directing to said remote station first character data signals corresponding to the query and reply data stored in said first data storage section; second data transmission means for directing to said remote station second character data signals corresponding to the data stored in said second section of said data storage means; display control means at said remote station and responsive to either of said first and second character data signals to activate said electro-responsive data display device to present characters on the viewing screen thereof corresponding to the respective character data signals; and manually-operable switch means at said remote station for selectively directing said first or second character data signals to said display control means, whereby to present on said viewing screen characters corresponding to query and reply messages stored in said data storage means, or characters corresponding to said different class of data stored in said second section of said data storage means.

10. Apparatus as claimed in claim 9, wherein said system includes a plurality of said remote stations, each of said remote stations being assigned a respective section of said data storage means for the storage of query and reply messages for the corresponding remote station; said central station including first means responsive to first control signals from any of said remote stations and operable to direct to the signalling remote station for display all of the character data stored in the respective query-and-reply section of said data storage means; second means at said central station responsive to second control signals from any of said remote stations for directing to the signalling remote station all of the character data stored in said second section of said data storage means, whereby any remote station can operate with its assigned storage section to carry out query and reply operations, or alternatively can have access to the data stored in said second section.

11. A system for displaying data which may be presented in a plurality of different formats, each of which may have one or more lines, the data to be presented in one of said formts being different from the data to be presented in another of said formats, comprising:

an electro-responsive data display means capable of displaying data in a plurality of formats, having a viewing screen;

means for selecting the desired display format;

means responsive to said format selecting means for controlling said display means to trace a raster pattern for the desired format on said viewing screen;

means for cyclically applying the data to said system, the time at which data for one of said formats is applied to the system being different from the time at which data for another of said formats is applied; and data selecting means responsive to said format selecting means for selecting from the applied data only the data associated with the desired format to present to said display means.

12. A system of the type described in claim 11 wherein said raster pattern tracing means includes:

electronic control means for causing a single horizontal sweep of said viewing screen for each row of data to be displayed;

means responsive to said selecting means for controlling the point of origin of each of said sweeps and the spacing between sweeps;

electronic control means for causing a plurality of vertical strokes for each of said sweeps; and means responsive to said selecting means for controlling the length of said strokes.

13. A system of the type described in claim 11, including:

means for storing data which may be applied to said display means, said storing means being of the type which periodically presents the data stored therein to be read out; and wherein said picking means is enabled to apply data to said display means only during time intervals when the data required for the desired format is being read out from said storing means.

14. A system of the type described in claim 11 wherein there is a plurality of said data display means;

wherein there is a selecting means for each of said display means; and wherein said picking means is responsive to each of said selecting means for applying to the corresponding display means only the data required for the desired format at that display means.

15. A system of the type described in claim 14 wherein, for a given format, different data may be displayed at each of said display means;

wherein said data applying means operates on a cyclic basis, with the time in the cycle at which an input for a given format appears determining the display means to which it is to be directed; and wherein said picking means includes means for time multiplexing the cyclically applied data to the appropriate display means.

16. A system of the type described in claim 11 wherein said raster pattern tracing means includes:

means for generating synchronizing pulses;

and including:

a common data-synch input line to said display means; and means for appropriately interspersing said synchronizing pulses with said data on said common input line.

17. A system of the type described in claim 16 wherein the synchronizing pulse sequence for one of said formats is different from the synchronizing pulse sequence for the other of said formats; and wherein said synchronizing pulse generating means is adapted to generate the proper pulse sequences during the time intervals when data in each of said formats are being applied to said system.

References Cited

UNITED STATES PATENTS

| | | | |
|---|---|---|---|
| 3,011,164 | 11/1961 | Gerhardt | 315—24 |
| 3,182,308 | 5/1965 | Dutton et al. | 340—324.1 |
| 3,298,013 | 1/1967 | Koster | 340—324.1 |
| 3,307,156 | 2/1967 | Durr | 340—324.1 |
| 3,423,749 | 1/1969 | Newcomb | 340—324.1 |

THOMAS B. HABECKER, Primary Examiner

M. M. CURTIS, Assistant Examiner

U.S. Cl. X.R.

340—154